(12) United States Patent
Islam et al.

(10) Patent No.: US 9,640,858 B1
(45) Date of Patent: May 2, 2017

(54) PORTABLE ELECTRONIC DEVICE WITH AN ANTENNA ARRAY AND METHOD FOR OPERATING SAME

(71) Applicant: Motorola Mobility LLC, Chicago, IL (US)

(72) Inventors: Md Islam, Lombard, IL (US); Michael Russell, Lake Zurich, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/086,819

(22) Filed: Mar. 31, 2016

(51) Int. Cl.
  H04M 1/00 (2006.01)
  H01Q 1/27 (2006.01)
  H04B 1/3827 (2015.01)

(52) U.S. Cl.
  CPC ............. H01Q 1/273 (2013.01); H04B 1/385 (2013.01)

(58) Field of Classification Search
  CPC .......... H01Q 1/273; H01Q 1/24; H04B 1/385; H04B 7/26; H04B 2001/3866; H04B 2001/3861; H04W 4/008; H04W 8/005; H04M 1/7253; G06F 3/011; G06F 3/014; G02B 2027/0138; G02B 2027/0178
  USPC ............... 455/575.7; 342/372, 360, 373, 380
  See application file for complete search history.

(56) References Cited

U.S. PATENT DOCUMENTS

| | | | | |
|---|---|---|---|---|
| 4,712,070 A | * | 12/1987 | Clark | G01V 3/28 324/333 |
| 4,845,433 A | * | 7/1989 | Kleinberg | G01V 3/28 324/329 |
| 8,964,298 B2 | * | 2/2015 | Haddick | G06F 3/013 359/630 |
| 2005/0046584 A1 | * | 3/2005 | Breed | B60C 11/24 340/13.31 |
| 2008/0252540 A1 | * | 10/2008 | Worl | H01Q 9/28 343/772 |
| 2011/0169515 A1 | * | 7/2011 | Nielsen | G01R 1/07392 324/750.16 |

(Continued)

OTHER PUBLICATIONS

Giorgio V. Borgiotti and Quirino Balzano, "Mutual Coupling Analysis of a Conformal Array of Elements on a Cylindrical Surface", IEEE Transactions on Antennas and Propagation, vol. AP-18, No. 1, Jan. 1970, pp. 55-63.

(Continued)

*Primary Examiner* — Mahendra Patel
(74) *Attorney, Agent, or Firm* — Cygan Law Offices P.C.

(57) ABSTRACT

Apparatus includes a device housing, a device face, a printed circuit board (PCB), and an antenna array. The device housing has a shape characterized by an axis, a planar housing surface that is perpendicular to the axis, and a housing sidewall that is parallel to the axis. The housing sidewall is positioned along a periphery of a planar housing surface. The device face is positioned at an opposite end of the device housing from the planar housing surface. The PCB is positioned between and parallel to the planar housing surface and the device face. The antenna array has multiple antenna elements at least some of which are electrically coupled to the PCB. The antenna array is configured to concentrate radiation of radio waves laterally through a radiation plane that is parallel to the sidewall of the housing and that is perpendicular to the device face and the planar housing surface.

20 Claims, 16 Drawing Sheets

(56) References Cited

U.S. PATENT DOCUMENTS

| | | | |
|---|---|---|---|
| 2011/0221896 A1* | 9/2011 | Haddick | G02B 27/017 348/143 |
| 2011/0241949 A1* | 10/2011 | Nickel | H01Q 1/243 343/702 |
| 2013/0050031 A1* | 2/2013 | Zhu | H01Q 1/2266 343/702 |
| 2013/0050050 A1* | 2/2013 | Zhu | H01Q 1/2283 343/866 |
| 2013/0100000 A1* | 4/2013 | Reavis | H01Q 1/273 343/895 |
| 2014/0104157 A1* | 4/2014 | Burns | H01Q 1/243 345/156 |
| 2014/0364691 A1* | 12/2014 | Krivopisk | A61B 1/00096 600/109 |
| 2015/0031292 A1* | 1/2015 | Holman | H04W 4/008 455/41.2 |
| 2015/0357703 A1* | 12/2015 | Nickel | H01Q 1/243 343/702 |

OTHER PUBLICATIONS

V. Semkin, et al., "Conformal Antenna Array for Millimeter-Wave Communications: Performance Evaluation", 2015, 11 pages.

* cited by examiner

PORTABLE ELECTRONIC DEVICE WITH AN ANTENNA ARRAY AND METHOD FOR OPERATING SAME

FIELD OF THE DISCLOSURE

The present disclosure relates generally to antenna arrays in portable electronic devices and more particularly to antenna arrays that concentrate radiation of radio waves through a sidewall of a portable electronic device.

BACKGROUND

5th Generation ("5G") mobile communications depend on millimeter-wave frequencies (e.g., >24 GHz). Generally, to establish a wireless link at millimeter-wave frequencies in portable devices, there are few, if any, alternatives other than using an antenna array. However, due to space constraints in portable devices, it is difficult to incorporate multiple antenna elements to form the antenna array. For example, positioning the antenna array, in the device, so that it concentrates radiation of radio waves towards a device display can cause significant gain reduction due to interference with the device display and intermediary device components. Additionally, positioning the antenna array so that it concentrates radiation of radio waves towards a wearer's hand or other body part can cause significant gain reduction due to interference with the wearer's body part. Also, incorporating the antenna array in a relatively small form factor, dictated by the device dimensions, makes it more difficult to satisfy phase and amplitude control requirements.

BRIEF DESCRIPTION OF THE FIGURES

The accompanying figures, where like reference numerals refer to identical or functionally similar elements throughout the separate views, form part of the specification and illustrate embodiments in accordance with the included claims.

Figure 1:
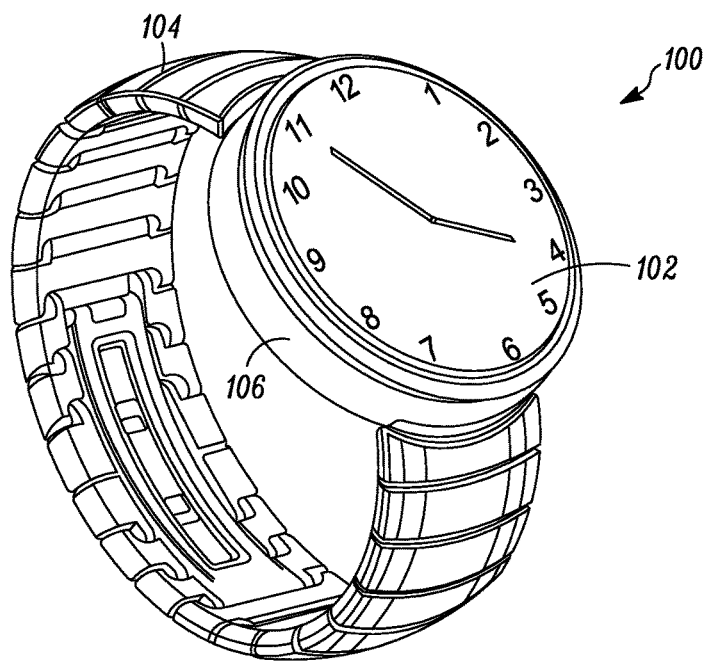
FIG. 1 shows wearable electronic devices that utilize an antenna array, in accordance with some embodiments.
Figure 1:
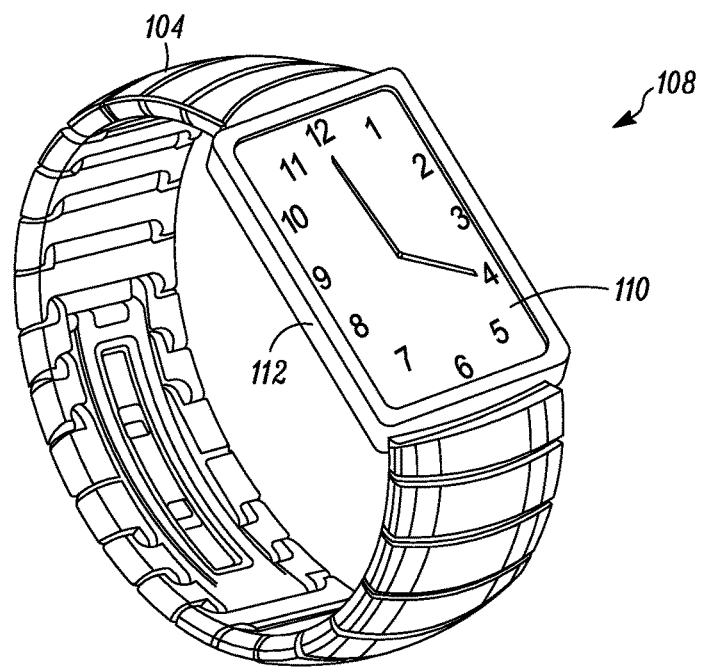
Figure 2:
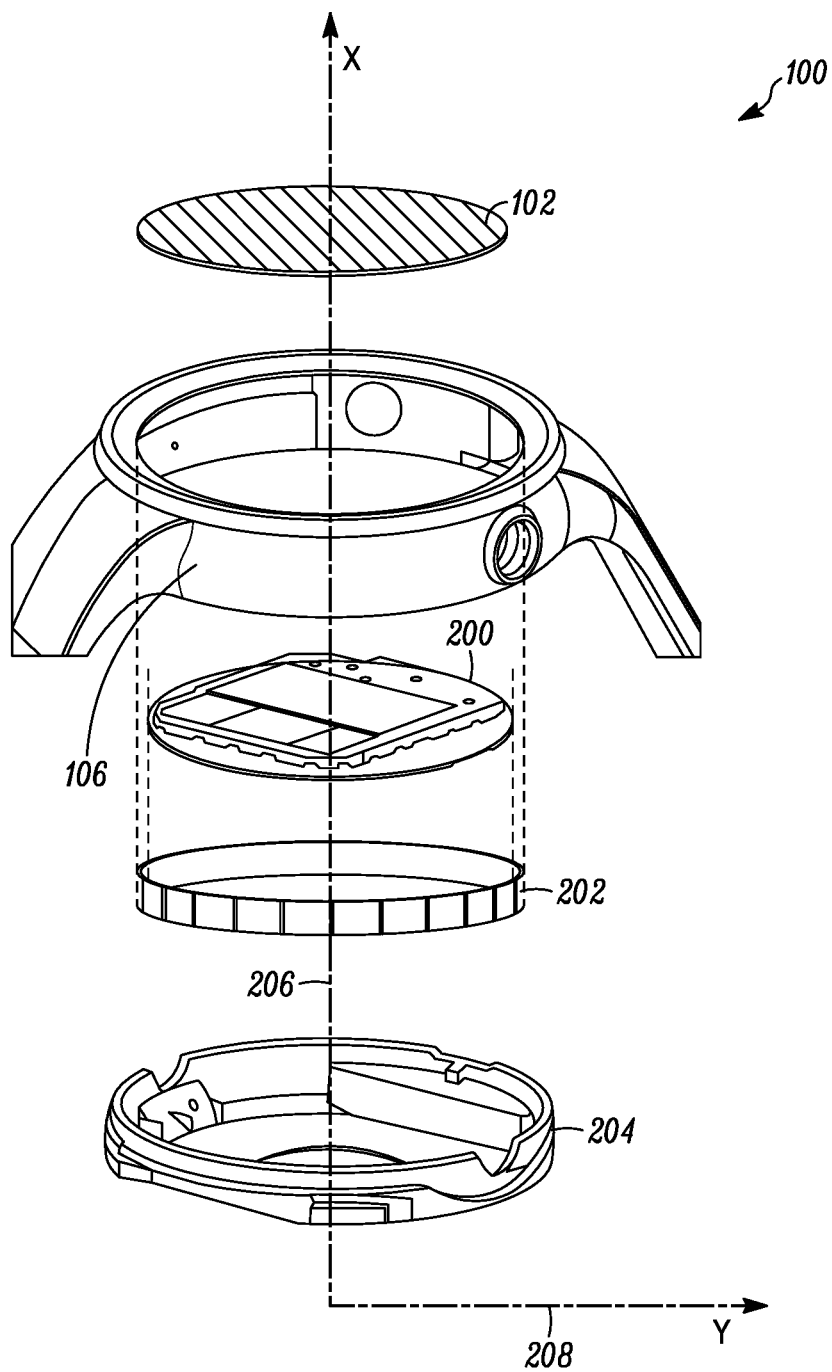
FIG. 2 shows an exploded view of a wearable electronic device that utilizes an antenna array, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present teachings. In addition, the description and drawings do not necessarily require the order presented. It will be further appreciated that certain actions and/or steps may be described or depicted in a particular order of occurrence while those skilled in the art will understand that such specificity with respect to sequence is not actually required.

Apparatus and method components have been represented, where appropriate, by conventional symbols in the drawings, showing only those specific details that are pertinent to understanding the embodiments of the present teachings so as not to obscure the disclosure with details that will be readily apparent to those of ordinary skill in the art having the benefit of the description herein.

DETAILED DESCRIPTION

Generally speaking, pursuant to various embodiments, described herein are an antenna array for a portable electronic device, such as a wearable electronic device, and a method for operating the antenna array to concentrate radiation of radio waves through a sidewall of the portable electronic device.

FIG. 1 illustrates a representative wearable electronic device 100 in which embodiments of an antenna array can be implemented. The wearable electronic device 100 includes a device housing having a shape and a sidewall 106 and a device face 102 coupled to the device housing. Illustratively, a cross-section of the device housing is in a shape of a closed-plane curve which, in this case, is circular. A "closed-plane curve" is defined herein as a line that is bent around until its ends join together. Examples of closed-plane curves are circles, ellipses, and ovals. The wearable electronic device 100 further includes a wearable element 104, in this case a wristband, attached to the wearable electronic device 100 that allows the wearable electronic device 100 to be worn on a person's body.

FIG. 1 further illustrates a representative wearable electronic device 108 in which embodiments of an antenna array can be implemented. Wearable electronic device 108 includes a device housing having a shape and a sidewall 112, a device face 110 coupled to the device housing, and the wristband 104. A cross-section of the device housing of the wearable electronic device 108 is in a shape of a polygon which, in this case, is rectangular. A "polygon" is defined herein as a shape made of straight lines that are connected so that the shape is closed. Examples of polygons are squares, rectangles, and triangles. Accordingly, the device housing 100 can have other shapes, such as square, oval, etc.

Wearable electronic devices 100 and 108, which further include (as shown in other figures) elements of a printed circuit board and an antenna array according to the present teachings, are depicted as smartwatches to illustrate embodiments of devices and methods disclosed herein. However, other types of electronic devices can be embodied in accordance with the teachings herein. Such devices include, but are not limited to: other types of wearable electronic devices such as eyewear that incorporates a portable electronic device; portable electronic devices for monitoring body functions such as heart rate monitors and pulse monitors; etc.

FIGS. 2, 6, 8, 10, and 13 show exploded views of the wearable electronic device 100 having different antenna array configurations in accordance with the present teachings. More particularly, the exploded views shown in FIGS. 2, 6, 8, 10, and 13 each depict the device 100 as having a device housing with: a shape (in this case circular) characterized by an axis, shown as an x-axis 206; a planar housing surface 204 that is perpendicular to the x-axis 206, e.g., is aligned with a y-axis 208; and the housing sidewall 106, which is parallel or aligned to the x-axis 206. The housing sidewall 106 is positioned along a periphery of the planar housing surface 204, for instance when the device 100 is assembled.

The device 100 further includes the device face 102 coupled to the device housing and positioned perpendicular to the x-axis 206 at an opposite end of the device housing from the planar housing surface 204. A printed circuit board (PCB) 200 is positioned within the device housing between and parallel to the planar housing surface 204 and the device face 102. The device 100 also includes different embodiments of an antenna array, e.g., 202 (FIG. 2), 600 (FIG. 6), 800 (FIG. 8), 1000 (FIG. 10), and 1300 (FIG. 13), having multiple antenna elements at least some of which are electrically coupled to the printed circuit board 200, for instance via a connection to a signal source that is coupled to the PCB 200 and/or a coupling to a ground segment of the PCB 200.

For each embodiment, the antenna array is configured to concentrate radiation of radio waves laterally through a radiation plane that is parallel to the housing sidewall 106 and that is perpendicular to the device face 102 and the planar housing surface 204. Example benefits of this configuration include: a decreased likelihood of antenna gain reduction due to interference from a wearer's hand or other body part; and a decreased likelihood of antenna gain reduction due to interference from the device face and/or other device components.

The PCB 200 has mounted thereon one or more integrated circuits (ICs) that control various functions of the device 100. For example, the PCB 200 includes an IC having a processing element that executes applications (apps) such as weather apps, music apps, social media apps, etc., stored in memory on the IC. The PCB 200 further includes thereon one or more transceiver ICs electrically coupled to one or more antennas or antenna arrays of the device 100, including an antenna array consistent with the disclosed embodiments.

As used herein, connecting, or a connection between, two elements or components, means that the two elements are in direct or immediate contact with one another without intermediary components between them. Coupling includes a direct connection and also extends to instances where one or more intermediary components, each connected to a neighboring component, provide an indirect connection pathway between coupled components.

As an example, the electrical coupling of each of a plurality of antenna elements of the antenna array includes the antenna element being electrically connected to at least a first "port" or connection point of a "signal source" that is electrically coupled to a transceiver IC mounted on the PCB 200. A second port of the signal source is connected to electrical ground, for instance a ground segment of the PCB 200, to provide a ground reference for the antenna array.

The signal source represents one or more electronic components that provide a data-carrying electrical signal from a transmitter of the transceiver IC. The antenna element converts the received electrical signal into radio waves, which are radiated from or through the housing sidewall 106 of the device 100. The signal source further represents one or more electronic components that receives a voltage induced by the antenna element when it picks up or detects radio waves at or through the housing sidewall 106 of the device 100. The detected radio waves could have originated from antenna elements of external devices such as cellular base stations or Wi-Fi access points. The signal source provides the induced voltage from the antenna element for further processing by receiver circuitry on the transceiver IC.

Figure 9:
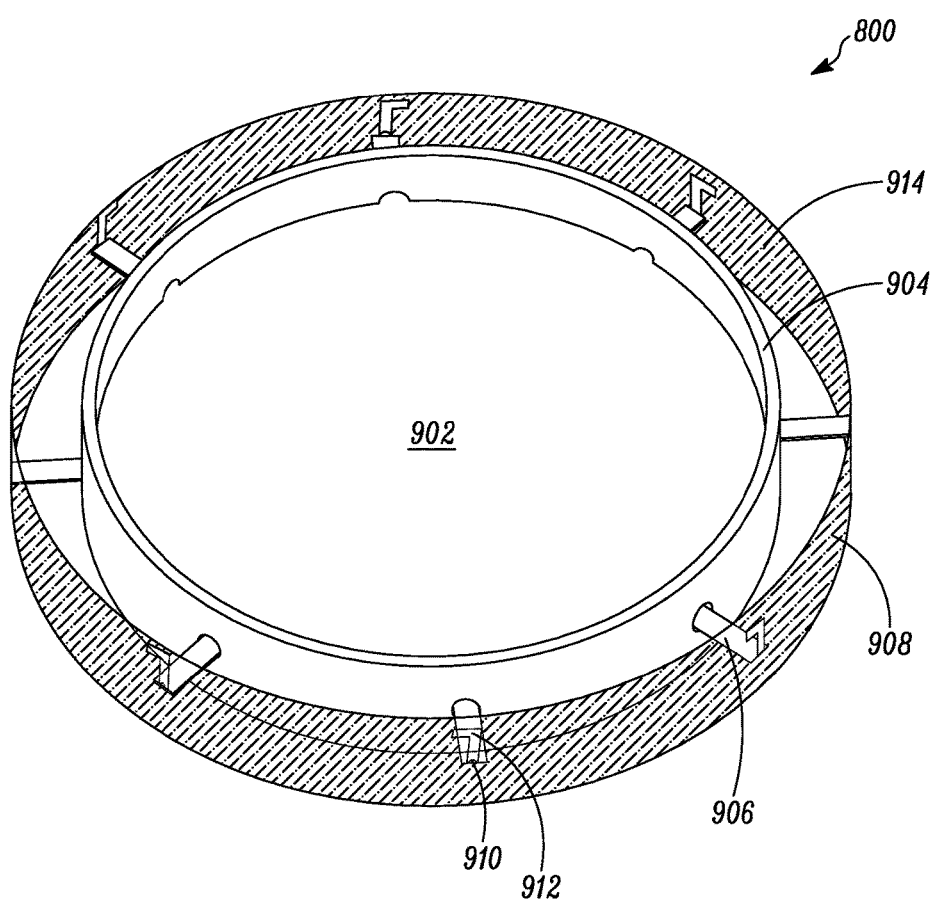
FIG. 9 shows a perspective view of the antenna array shown in FIG. 8, in accordance with some embodiments.

The components of the signal source can be mounted on the PCB, for instance included as part of the transceiver IC. In this case, a feed line, e.g., a waveguide or hollow metal wave-shaping component, connects the antenna element to the first port of the signal source. Alternatively, the components of the signal source are mounted remotely from the PCB (but electrically coupled to the transceiver IC on the PCB) with the first port of the signal source directly connected to the antenna element, for instance as illustrated in FIG. 9. When the signal source is located on the PCB 200, its ports can be pins of the transceiver IC. When the signal source is located remotely from the PCB 200, its ports can connect to pins of the transceiver IC, for instance by metal traces.

As illustrated, the x-axis 206 is centrally located such that it passes through a central point of the device face 102, the housing sidewall 106, the printed circuit board 200, the antenna array, and the planar housing surface 204 of the device 100. Accordingly, the device face 102, the housing sidewall 106, the printed circuit board 200, the antenna array, and the planar housing surface 204 of the device 100 are circular and symmetrical about the x-axis 206. However, such symmetry is not required. Moreover, for each antenna array embodiment, antenna elements are electrically coupled to and around an edge of the printed circuit board 200 of the device 100, whether directly on an edge of the printed circuit board 200 or on a substrate that is mounted vertically around a periphery of the printed circuit board 200. This arrangement minimizes losses during radio wave transmission due to nearby components within the device 100 and frees up space in the device 100 for other antennas, for example GPS and Bluetooth antennas.

For an embodiment, the device housing is made of non-metallic material such as plastic but includes an inner metal "puck" or wall having a similar shape and form factor as the housing sidewall and other elements of the device 100. The inner metal wall can act, serve, or function as electrical ground for the antenna array. In other embodiments, the device housing is made of metallic material, which can function as the electrical ground for the antenna array. For additional embodiments, one or more ground segments, e.g., ground plates, layers, or planes, of the printed circuit board 200 functions as electrical ground for the antenna array, as is later described.

Additionally, the antenna elements can be fabricated using a printed circuit board fabrication technology. For example, a metal layer is added to, for instance printed on, an insulating dielectric substrate either on the PCB 200 or remote from the PCB 200, and the antenna elements are patterned from the metal layer. The antenna elements can be patterned as monopoles, dipoles, inverted-Fs, patches, etc., having lengths (e.g., quarter-wavelength, half-wavelength, etc.) needed to radiate radio waves at the desired frequencies.

Figure 3:
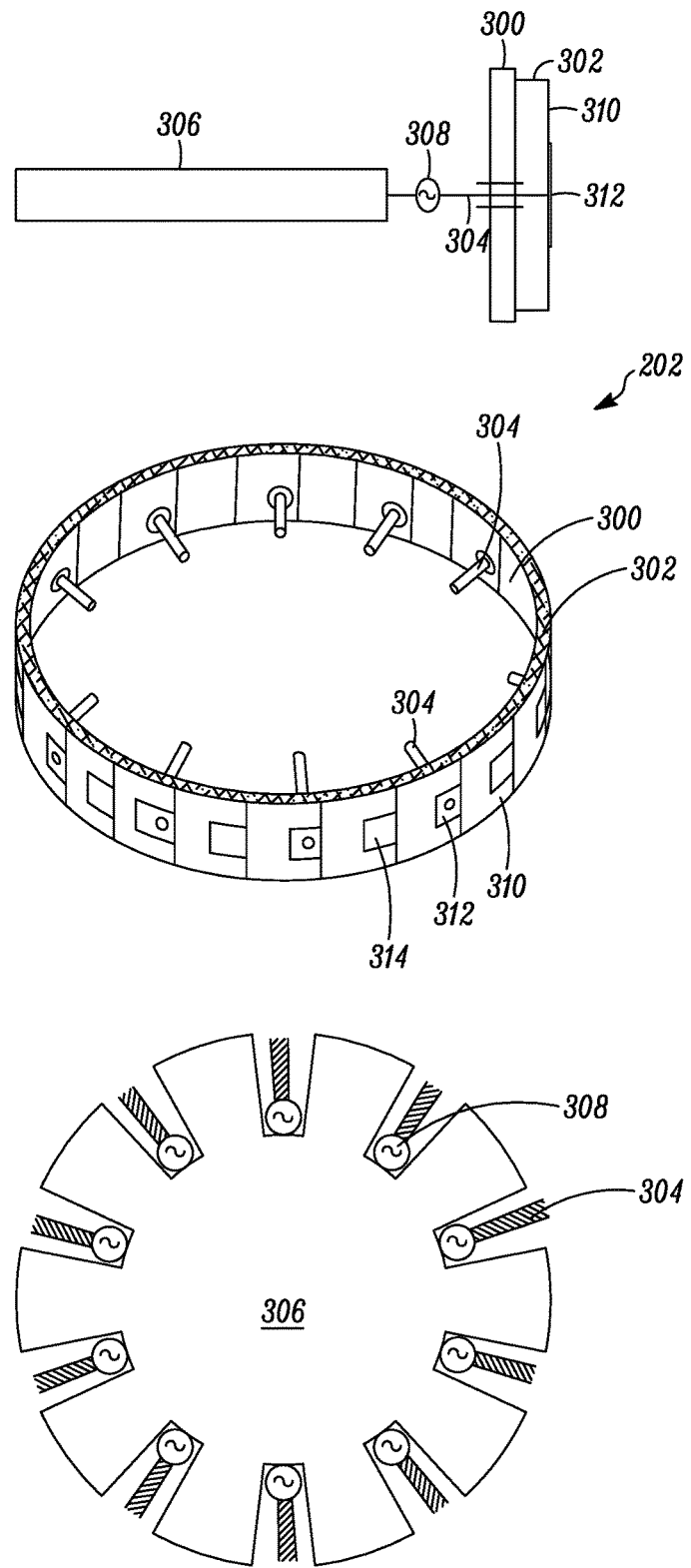
FIG. 3 shows multiple views of the antenna array shown in FIG. 2, in accordance with some embodiments.

FIG. 3 illustrates details the antenna array 202. The antenna array 202 has a substrate 302 positioned parallel to the housing sidewall 106 and perpendicular to the printed circuit board 200. Multiple antenna elements 312, 314 are arranged on a face 310 of the substrate 302. For this embodiment, a first subset 312 of the multiple antenna elements is electrically coupled to the PCB 200 using a set of feed lines 304, and a second subset 314 of the multiple antenna elements are passive or "parasitic" antenna elements. For embodiments, such as this, where the antenna array is formed on a substrate positioned parallel to the housing sidewall and perpendicular to the PCB, the antenna array can be said to be formed as a vertical assembly relative to the PCB.

As shown in a center perspective view of FIG. 3, the multiple antenna elements of the antenna array 202 are a plurality of shaped patches of metal mounted on the substrate 302. For example, the antenna elements are microstrip antenna elements, also referred to in the art as patch antenna elements, which are patterned pieces of metal printed on a substrate. For a particular embodiment, the patch antenna elements (or patches for short) are 3 mm×3 mm square antenna elements. However, the patches can be any continuous shape, including but not limited to rectangular, circular, or elliptical; and the substrate can be any material having a suitable dielectric constant for use with microstrip antennas.

As further shown in the center perspective view of FIG. 3, the multiple antenna elements of the antenna array 202 include both "active" patches 312 and parasitic patches 314. More particularly, the active 312 and parasitic 314 patches are alternately mounted around the face 310 of the substrate 302. The parasitic patches 314 are not electrically coupled and, thereby, do not radiate radio waves. Conversely, the active patches 312 are electrically coupled to the PCB 200 in order to transmit and receive radio waves. Beneficially, the patches can be judiciously placed around the substrate 302 to create or retain a metallic feel of the housing sidewall 106 of the device 100, for example where the housing is made of plastic.

Top and bottom views in FIG. 3 illustrate details of the coupling of the active patches 312 to the PCB 200. As shown, each active patch 312 is connected to a feed line 304, which is electrically coupled to the PCB 200 through a signal source 308. Namely, the feed line 304 is connected to one port (e.g., a pin of a transceiver IC) of the signal source 308. A second port of the signal source 308 (e.g., another pin of the transceiver IC) is connected to a ground plane or segment 306 of the PCB 200.

For a particular arrangement, the substrate 302 is positioned between the device housing and an inner metal wall 300 within the device 100. In this example implementation, the substrate 302 is directed adjacent to and physically supported by the inner metal wall 300. However, for other implementations, a space separates the inner metal wall and the substrate. The PCB ground plane 306 is connected to the inner metal wall 300, using any suitable grounding scheme, to function as electrical ground for the antenna array 302. Additionally, the feed lines 304 are not directly connected to the electrical ground. Instead, the feed lines 304 extend through holes in the inner metal wall 300 and indirectly couple to the electrical ground through their connection to the signal source 308. Slots can be cut into the PCB 200 to receive the feed lines 304, as shown in the bottom view of FIG. 3.

Figure 4:
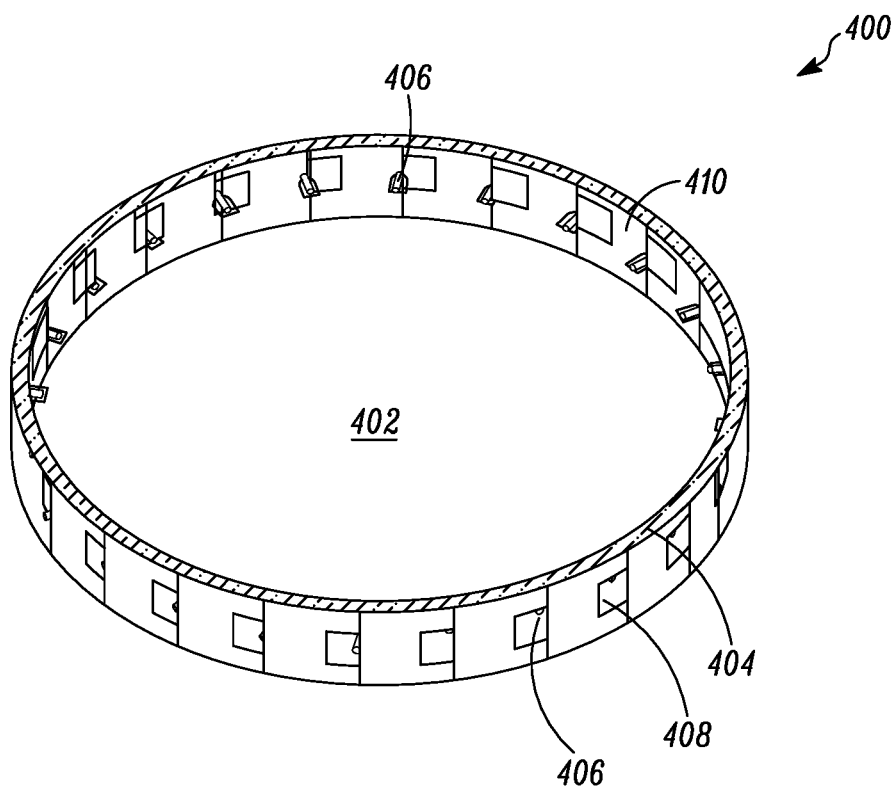
FIG. 4 shows a perspective view of an antenna array, in accordance with some embodiments.

FIG. 3 illustrates an embodiment 202 of an antenna array where a first subset 312 of the multiple antenna elements is electrically coupled to the printed circuit board 200 using a set of feed lines 304, and a second subset 314 of the multiple antenna elements are passive antenna elements. However, in another antenna array embodiment 400 shown in FIG. 4, all of the multiple antenna elements of the antenna array are electrically coupled to the printed circuit board using a set of feed lines.

Particularly shown, active patches 408 are mounted around a face of a substrate 404. Each active patch 408 is electrically coupled to the PCB 200 by a feed line 406 connecting to a signal source (not shown). The substrate 404 is positioned between the device housing and an inner metal wall 410 within the device 100. A PCB ground plane 402 is connected to the inner metal wall 410, using any suitable grounding scheme, to function as electrical ground for the antenna array 400. The feed lines 406, however, are not directly connected to the electrical ground. Instead, the feed lines 406 extend through holes in the inner metal wall 410 and indirectly couple to the electrical ground through their connection to the signal source. Although not shown, the signal source can be similar to the earlier described signal source 308 and its coupling of the feed lines 304 to the transceiver IC and the PCB ground plane 306.

A further benefit of the antenna array embodiments using the square patches is that they can operate at multiple frequencies. For example, the patches can be operated as microstrip patches at 28 GHz cellular or higher millimeter-wave frequencies and as top-hat loaded monopoles at 60 GHz to support WiGig communications.

Figure 5:
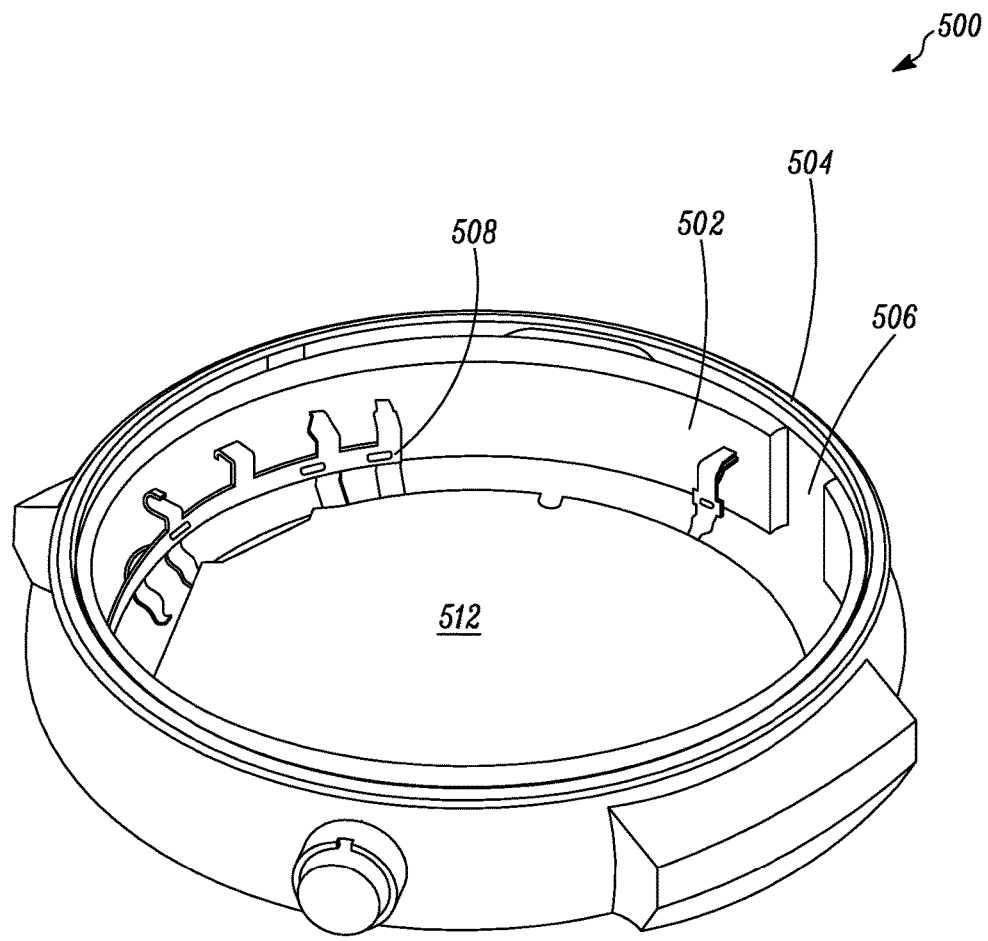
FIG. 5 shows a perspective view of a grounding scheme for an antenna array, in accordance with some embodiments.

FIG. 5 shows a perspective view of apparatus 500 within a portable electronic device, such as the device 100, which illustrates an example grounding scheme for an antenna array according to described embodiments. For an example, the grounding scheme illustrated with apparatus 500 can be used to connect the inner metal wall 300 with the PCB ground plane 306 of the antenna array 202 or to connect the inner metal wall 410 with the PCB ground plane 402 of the antenna array 400. Similarly, the grounding scheme illustrated with apparatus 500 can be used with other embodiments of antenna arrays, for instance other embodiments of antenna arrays, described herein, formed as a vertical assembly relative to the PCB. Accordingly, FIG. 5 shows apparatus which includes a printed circuit board 512. The PCB 512 has positioned vertically thereto an antenna array 506, which is located between a device housing sidewall 504 and an inner metal wall 502. The apparatus 500 further includes a contact piece having a set of multiple contacts 508 connecting the inner metal wall 502 to the PCB 512.

For one embodiment, at least a first subset of the set of contacts 508 function as electrical ground for the antenna array 506 by connecting the inner metal wall 502 to a ground segment or plane of the PCB 512. For another embodiment, at least a first subset of contacts 508 function as the electrical ground when the antenna array 506 operates at a first frequency and function as the electrical coupling to the printed circuit board 512 for at least a subset of the multiple antenna elements when the antenna array 506 operates at a second frequency. For example, some or all of the contacts 508 are diplexed or multiplexed to be electrical ground at lower frequencies, e.g., less than 6 GHz and feed lines connected to a transceiver IC at higher frequencies, e.g., greater than 24 GHz. For still another embodiment, at least some of the antenna elements of the antenna array 506 are electrically coupled to the PCB 512 using a set of feed lines (not shown) dispersed between at least some of the contacts 508.

Figure 6:
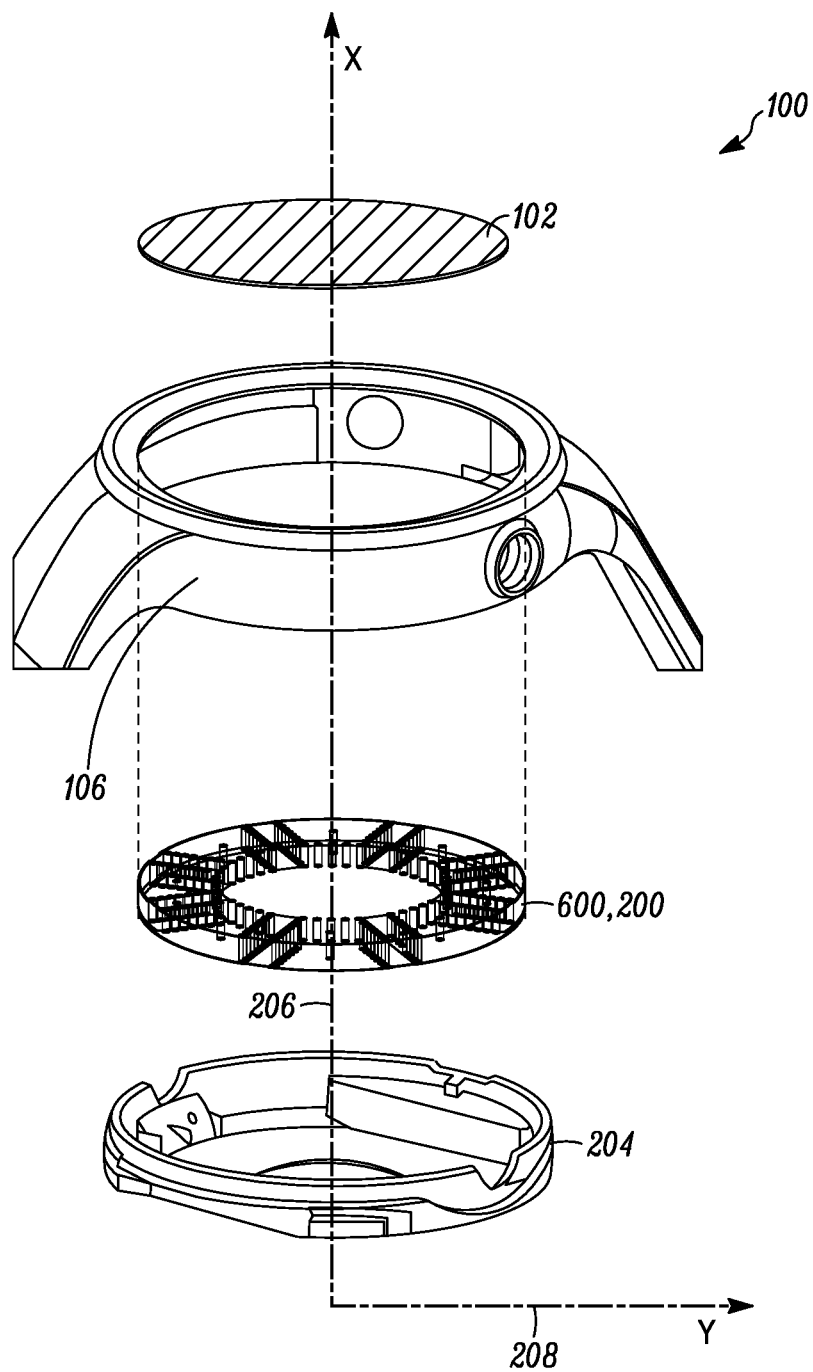
FIG. 6 shows an exploded view of a wearable electronic device that utilizes an antenna array, in accordance with some embodiments.
Figure 7:
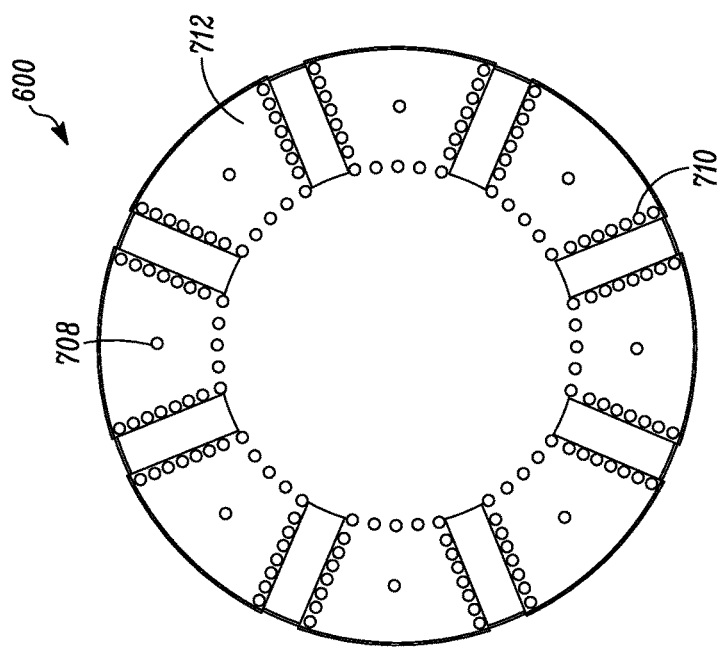
FIG. 7 shows multiple views of the antenna array shown in FIG. 6, in accordance with some embodiments.
Figure 7:
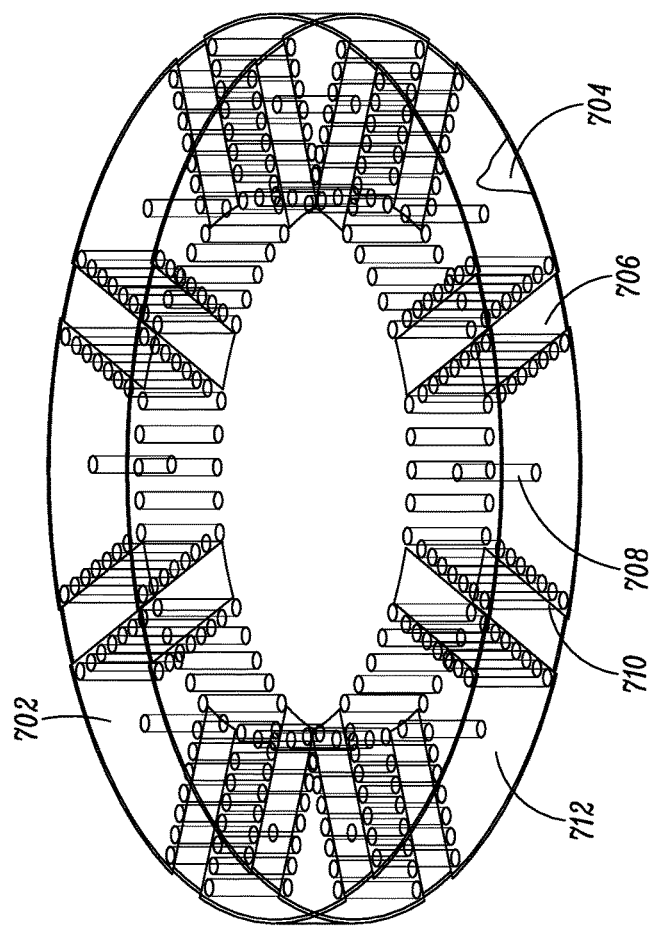

FIG. 6 shows an exploded view of the device 100 having a substrate integrated waveguide ("SIW") antenna array 600, wherein its multiple antenna elements are a plurality SIW antenna elements mounted between two layers of the printed circuit board 200. FIG. 7 shows a perspective view and a top plan view of the SIW antenna array 600. In this embodiment, the PCB 200 is a multi-layer PCB having first and second layers 702 and 706 positioned between and parallel to the planar housing surface 204 and the device face 102 and having a space therebetween. Layer 702 is a first planar metal surface, and layer 706 includes a second planar metal surface 704 overlaid, at least in part, by a substrate onto which electronics such as ICs are mounted. The first and second planar metal surfaces can act as ground planes for the PCB 200 and the SIW antenna array 600.

Each SIW antenna element 712 includes a plurality of conductive interconnects or vias 708 and 710. The vias 710 are connected between the first and second planar metal surfaces to form a cavity between aligned portions of the first 702 and second 706 layers of the PCB 200. As shown in the perspective view, the vias 710 are arranged as a non-continuous sidewall for the cavity. The via 708 serves as a feed line that electrically couples the SIW antenna element 712 to the PCB 200 within the cavity. For example, the via 708 is electrically coupled to a transceiver IC on the PCB 200 by a connection to a port of a signal source (not shown). The second port of the signal source is connected to a ground segment of the PCB 200, for instance the ground plane 704 or the ground plane 702 but not both. For an embodiment, the conductive vias 708 and 710 are cylindrical or other elongated-shaped pieces of metal that can be solid or hollow.

Figure 8:
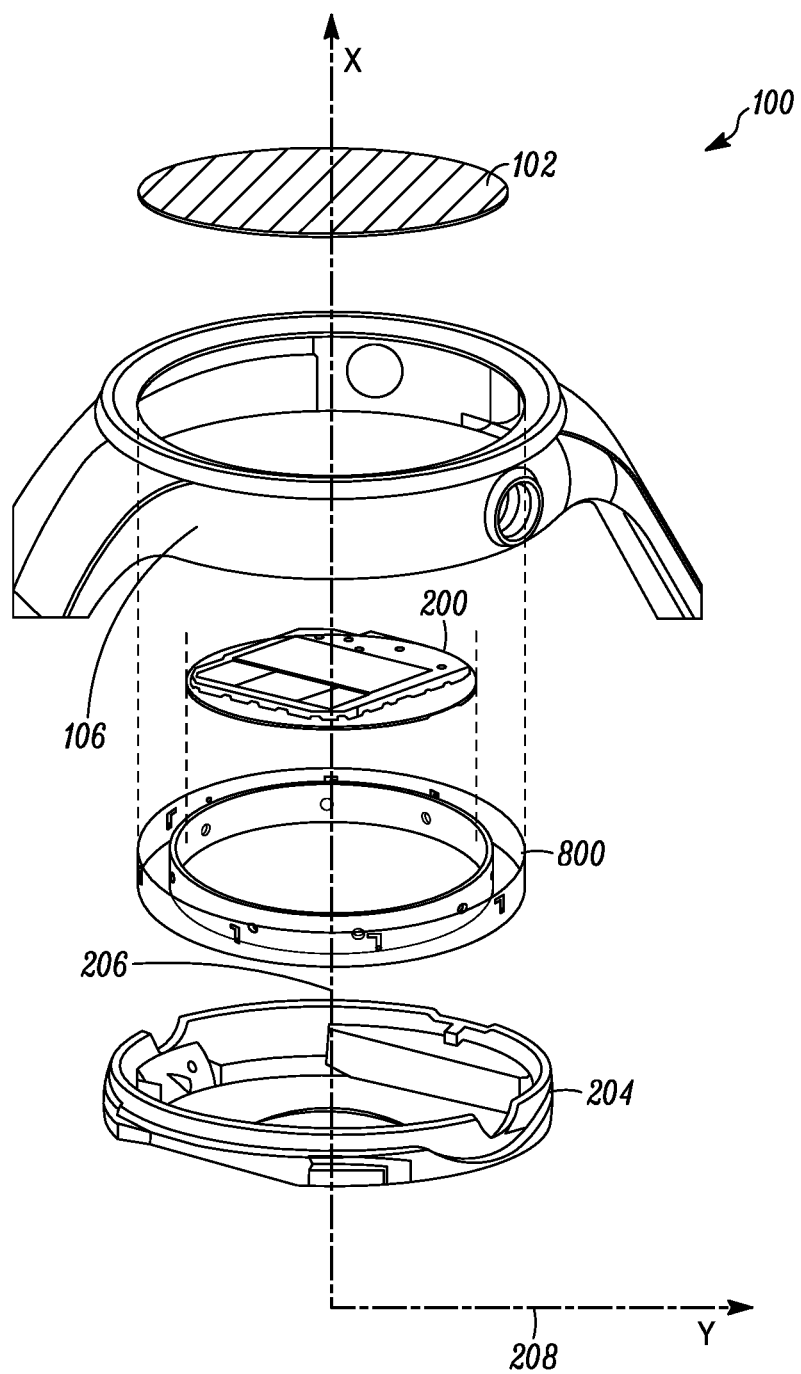
FIG. 8 shows an exploded view of a wearable electronic device that utilizes an antenna array, in accordance with some embodiments.

FIG. 8 shows an exploded view of the device 100 having a monopole antenna array 800, wherein its multiple antenna elements are a plurality of monopole antenna elements mounted on a substrate positioned parallel to the housing sidewall 106 and perpendicular to the printed circuit board 200. FIG. 9 shows a perspective view of the monopole antenna array 800. The antenna array 800 has a substrate 914 positioned parallel to the housing sidewall 106 and perpendicular to the printed circuit board 200. Multiple monopole antenna elements 912 are arranged around a face 908 of the substrate 914. For one example, each monopole antenna element 912 is a patterned piece of conductive material (e.g., metal) mounted (e.g., printed) on the substrate 914. The conductive pieces can have any suitable shape.

For the embodiment shown, each monopole antenna element 912 is connected to a first port of a signal source 910, which is also mounted on the substrate 914 remotely from the PCB 200. A second port of the signal source 910 is connected to a ground plane 902 of the PCB using an extension 906 of the PCB ground plane 902. For a particular embodiment, a substrate of the PCB with ICs mounted thereon overlays the PCB ground plane 902, with one of the ICs being a transceiver IC. The first port of each signal source 910 can be electrically coupled to the transceiver IC using metal traces on extensions of the substrate (not shown), which overlay the ground extensions 906, such that the first and second ports of the signal source 910 remain electrically isolated. Additionally, for the arrangement shown, the substrate 914 is positioned between the device housing and an inner metal wall 904 within the device 100. The PCB ground plane 902 is connected to the inner metal wall 904, using any suitable grounding scheme, to function as electrical ground for the monopole antenna array 800. In this case, the substrate 914 is not directly adjacent to the inner metal wall 904.

For an alternative arrangement, the signal source is located on the PCB 200, and each element 906 represents a feed line that couples the monopole antenna element 912 to the signal source on the PCB. Namely, the feed line 906 is connected to one port (e.g., a pin of a transceiver IC) of the signal source. A second port of the signal source (e.g., another pin of the transceiver IC) is connected to the ground plane 902 of the PCB 200. The substrate 914 is still positioned between the device housing and the inner metal wall 904 within the device 100, and the PCB ground plane 902 is connected to the inner metal wall 904. However, the feed lines 906 extend through holes in the inner metal wall 904 and indirectly couple to the electrical ground through their connection to the signal source.

Figure 10:
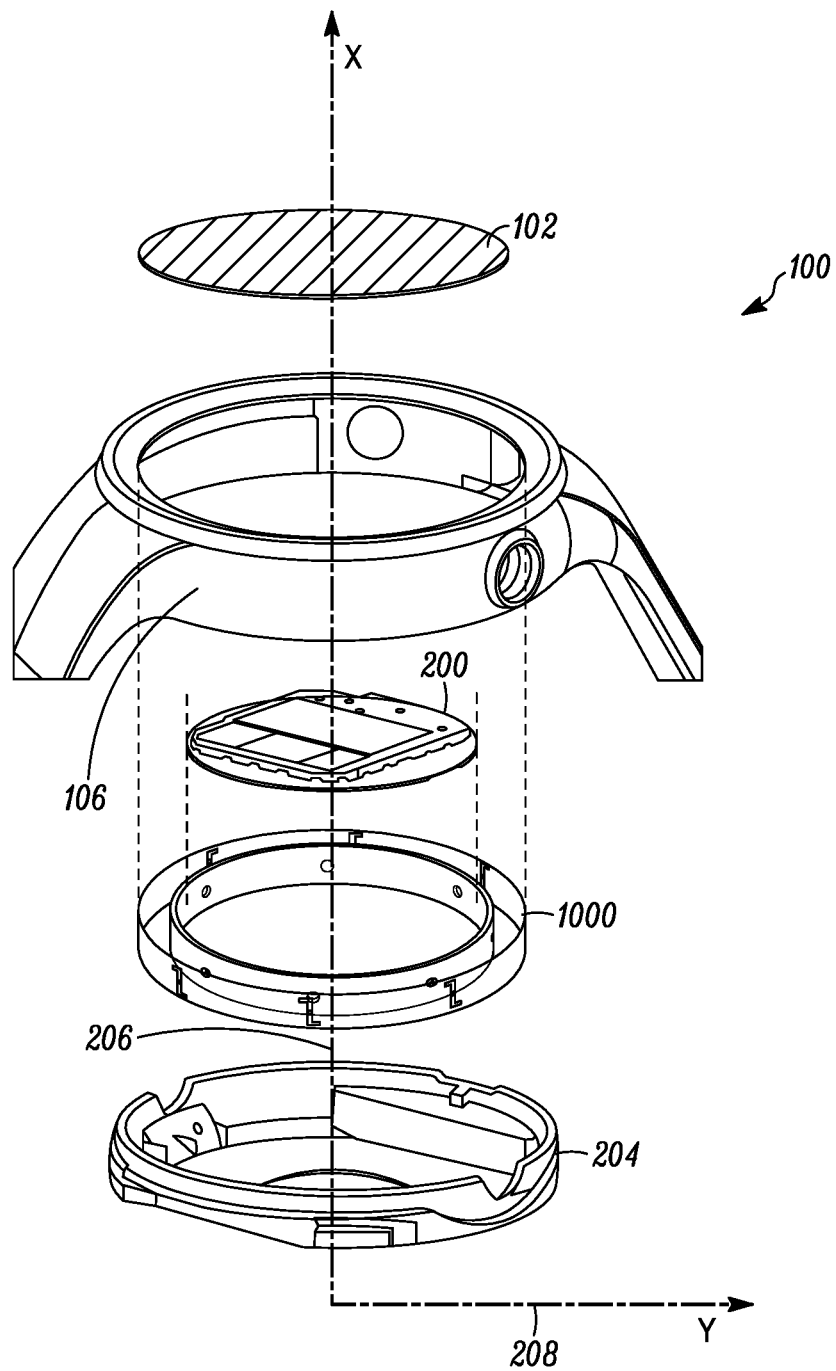
FIG. 10 shows an exploded view of a wearable electronic device that utilizes an antenna array, in accordance with some embodiments.
Figure 11:
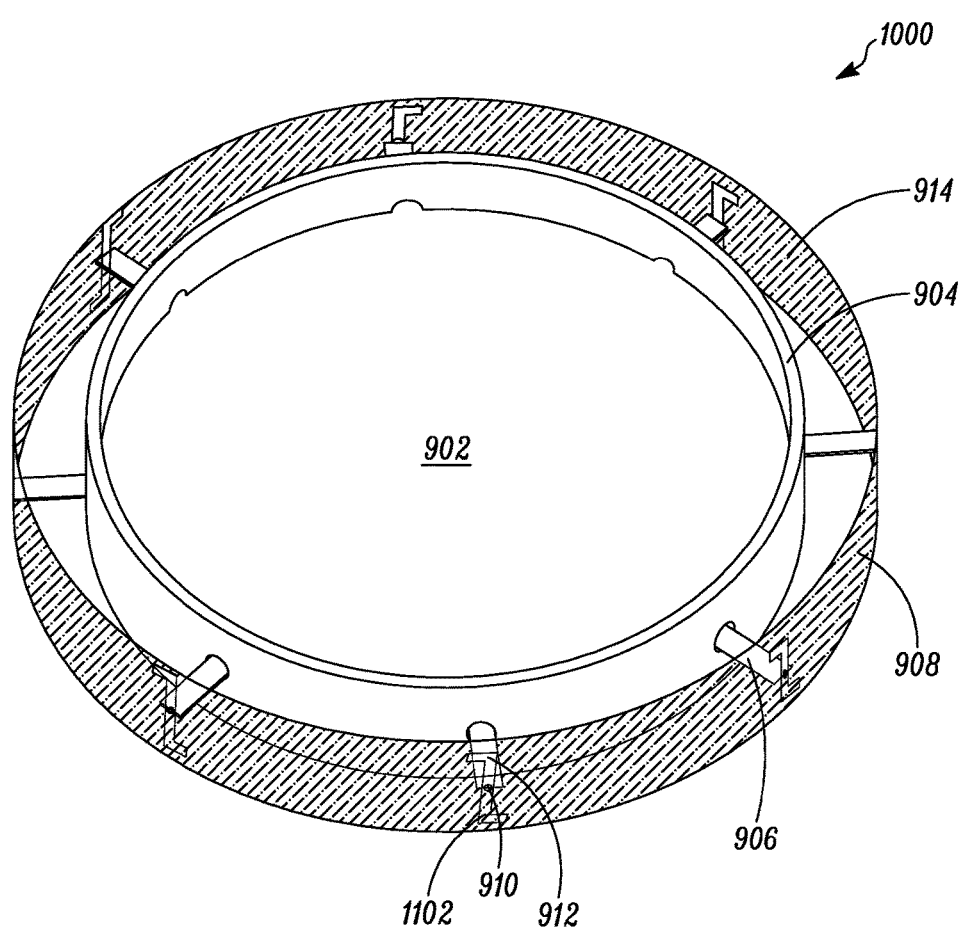
FIG. 11 shows a perspective view of the antenna array shown in FIG. 10, in accordance with some embodiments.

FIG. 10 shows an exploded view of the device 100 having a dipole antenna array 1000, wherein its multiple antenna elements are a plurality of dipole antenna elements mounted on a substrate positioned parallel to the housing sidewall 106 and perpendicular to the printed circuit board 200. FIG. 11 shows a perspective view of the dipole antenna array 1000. The antenna array arrangements 800 and 1000 are similar, and the description of the common elements of both antenna arrays is not repeated for the sake of brevity. The difference between the antenna array arrangements 800 and 1000 is that each dipole antenna element of the antenna array 1000 includes the conductive element 912 and a second conductive element 1102. The second conductive element 1102 is connected to a third port of the signal source 910, which also couples to the transceiver IC on the PCB 200. Accordingly, the first and second conductive elements of each dipole antenna element can be differentially fed from the signal source.

Figure 12:
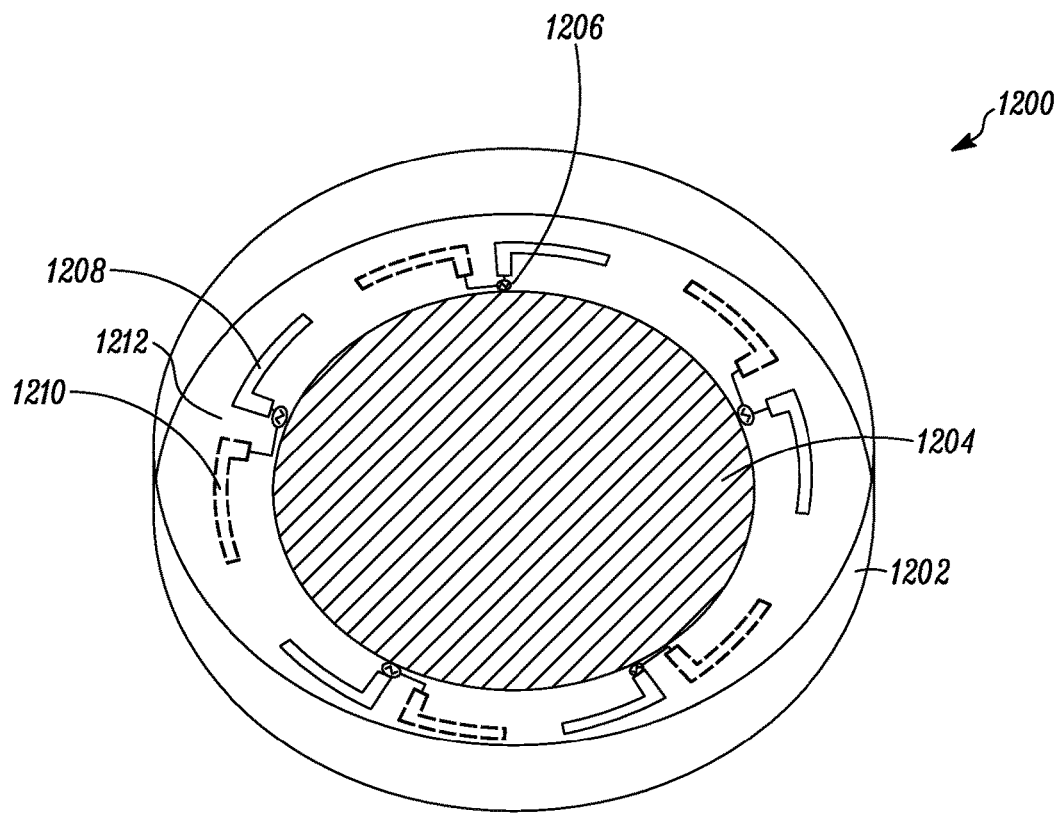
FIG. 12 shows multiple views of an antenna array, in accordance with some embodiments.
Figure 12:
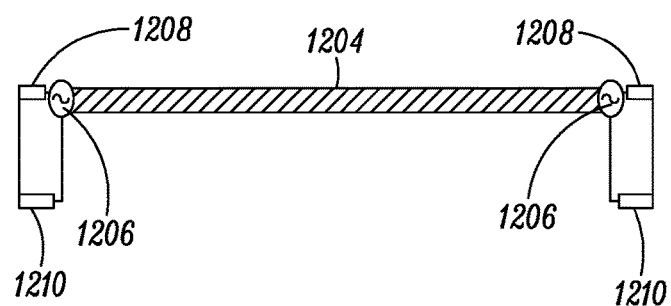

FIG. 12 shows a top view and a cross-sectional view of an embodiment of another dipole antenna array 1200, wherein its multiple antenna elements are a plurality of dipole antenna elements mounted at the edge of two layers of the PCB 200. In this embodiment, the PCB 200 is a multi-layer PCB having first 1212 and second 1202 layers having a space therebetween. The first layer 1212 includes a ground segment 1204 and a substrate segment adjacent to the ground segment 1204. The substrate segment covers an area deemed an "edge" of the layer 1212, which is less than half of the surface area of the layer 1212 and extends to an outer rim of the layer 1212. The layer 1202 includes a substrate segment that at a minimum covers an edge of the layer 1202 but can extend over a larger portion of the layer 1202. The substrate segment of the layer 1202 can have mounted thereon one or more ICs including a transceiver IC. In other embodiments, the ICs can be mounted on the substrate of the layer 1212 or on the substrates of both layers 1202 and 1212. Moreover, the layer 1202 may or may not include a ground segment (none is included in the arrangement shown).

Each dipole antenna element, of the dipole antenna array 1200, includes a first dipole arm 1208 mounted on the substrate segment at the edge of the layer 1212 and a second dipole arm 1210 (shown in phantom) mounted on the substrate segment at the edge of the layer 1202. For one example, the dipole arms 1208, 1210 are patterned pieces of conductive material (e.g., metal) mounted (e.g., printed) on the substrate segments. The conductive pieces can have any suitable shape. As illustrated in the cross-sectional view, a signal source 1206 having three ports electrically couples the dipole arms 1208 and 1210 to the PCB 200. The signal source 1206 can be included on a transceiver IC on the first 1212 or second 1202 layer. Namely, a first port of the signal source 1206 connects to the dipole arm 1208. A second port of the signal source 1206 connects to the dipole arm 1210, and a third port of the signal source 1206 connects to the PCB ground segment 1204. In general, the first and second ports have a phase shift of 180 degrees in between them (other phase shifts are also possible). Accordingly, the first and second dipole arms of each dipole antenna element can be differentially fed from the signal source 1206.

For a related embodiment, the antenna array 1200 is a monopole antenna array, wherein its multiple antenna elements are a plurality of monopole antenna elements mounted at the edge of a single layer of the PCB 200. For example, the PCB 200 has a single layer 1212 with the ground segment 1204 and the adjacent substrate segment at the edge of the layer 1212. Each monopole antenna element includes the monopole arm 1208 connected to a first port of a two-port signal source 1206, with the second port of the signal source 1206 connected to the ground segment 1204.

Figure 13:
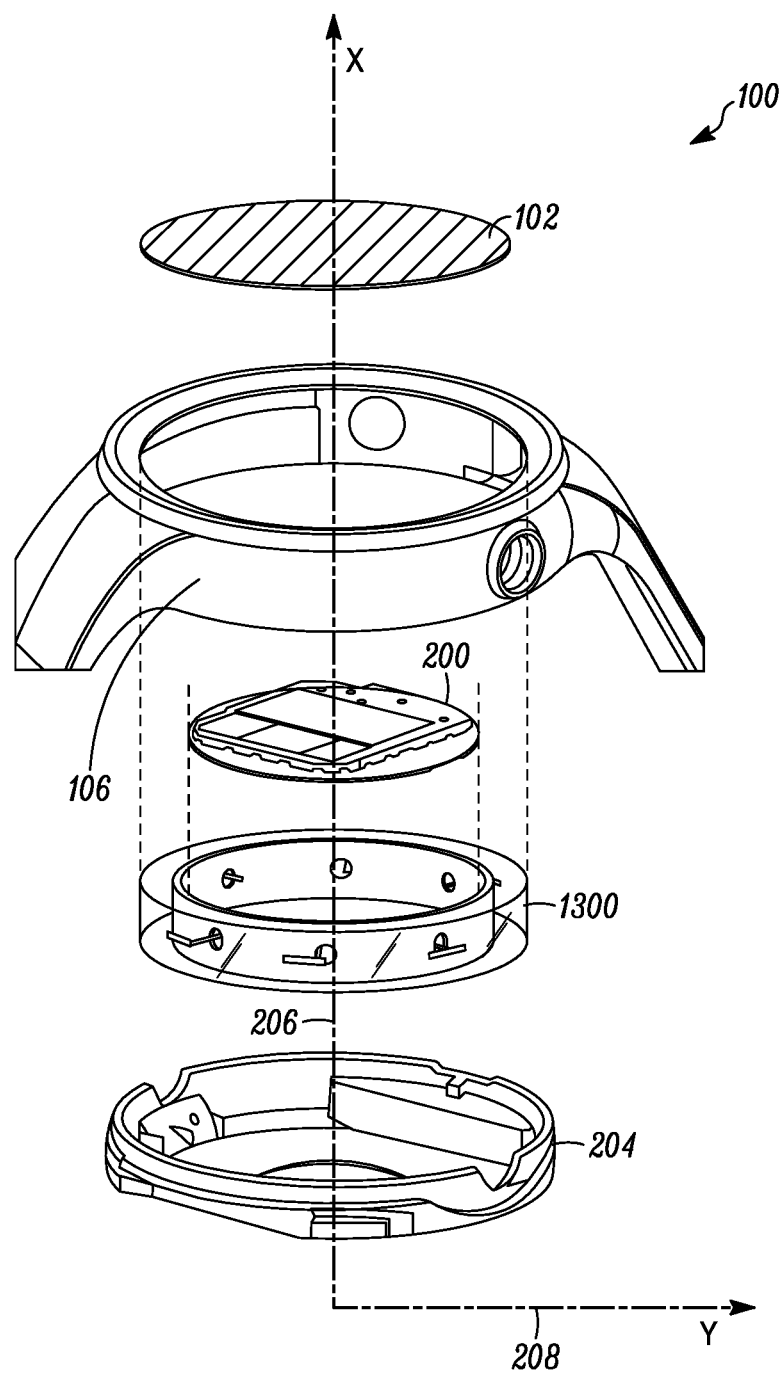
FIG. 13 shows an exploded view of a wearable electronic device that utilizes an antenna array, in accordance with some embodiments.
Figure 14:
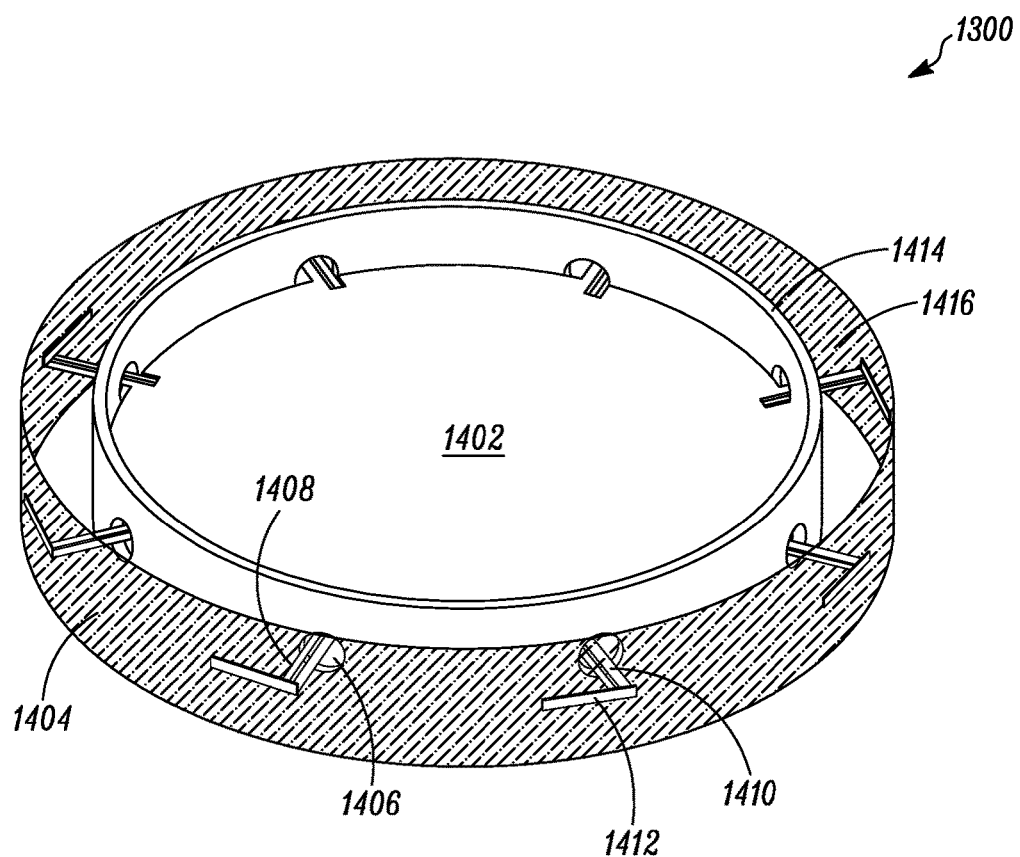
FIG. 14 shows a perspective view of the antenna array shown in FIG. 13, in accordance with some embodiments.

FIG. 13 shows an exploded view of the device 100 having an inverted-F antenna array 1300, wherein its multiple antenna elements includes a plurality of inverted-F antenna elements mounted on a substrate positioned parallel to the housing sidewall and perpendicular to the printed circuit board. FIG. 14 shows a perspective view of the inverted-F antenna array 1300. The inverted-F antenna array 1300 has a substrate 1416 positioned parallel to the housing sidewall 106 and perpendicular to the printed circuit board 200. Multiple inverted-F antenna elements are arranged around a face 1404 of the substrate 1416.

Each inverted-F antenna element includes: a monopole strip or patch 1412 (having a suitable shape); a grounding pin 1410 connected to an end of the monopole strip 1412; and a feed line 1408 connected between an intermediate point of the monopole strip 1412 and the ground plane 1402. The feed line 1408 couples the inverted-F antenna element to a signal source on the PCB 200. Namely, the feed line 1408 is connected to one port (e.g., a pin of a transceiver IC) of the signal source. A second port of the signal source (e.g., another pin of the transceiver IC) is connected to a ground plane 1402 of the PCB 200, which is also connected to the grounding pins 1410.

Additionally, for the arrangement shown, the substrate 1416 is positioned between the device housing and an inner metal wall 1414 within the device 100. In this case, the substrate 1416 is not directly adjacent to the inner metal wall 1414. The PCB ground plane 1402 is connected to the inner metal wall 1414, using any suitable grounding scheme, to function as electrical ground for the inverted-F antenna array 1300. Moreover, the feed lines 1408 and grounding pins 1410 extend through holes 1406 in the inner metal wall 1414 to electrically couple to the PCB 200.

Figure 15:
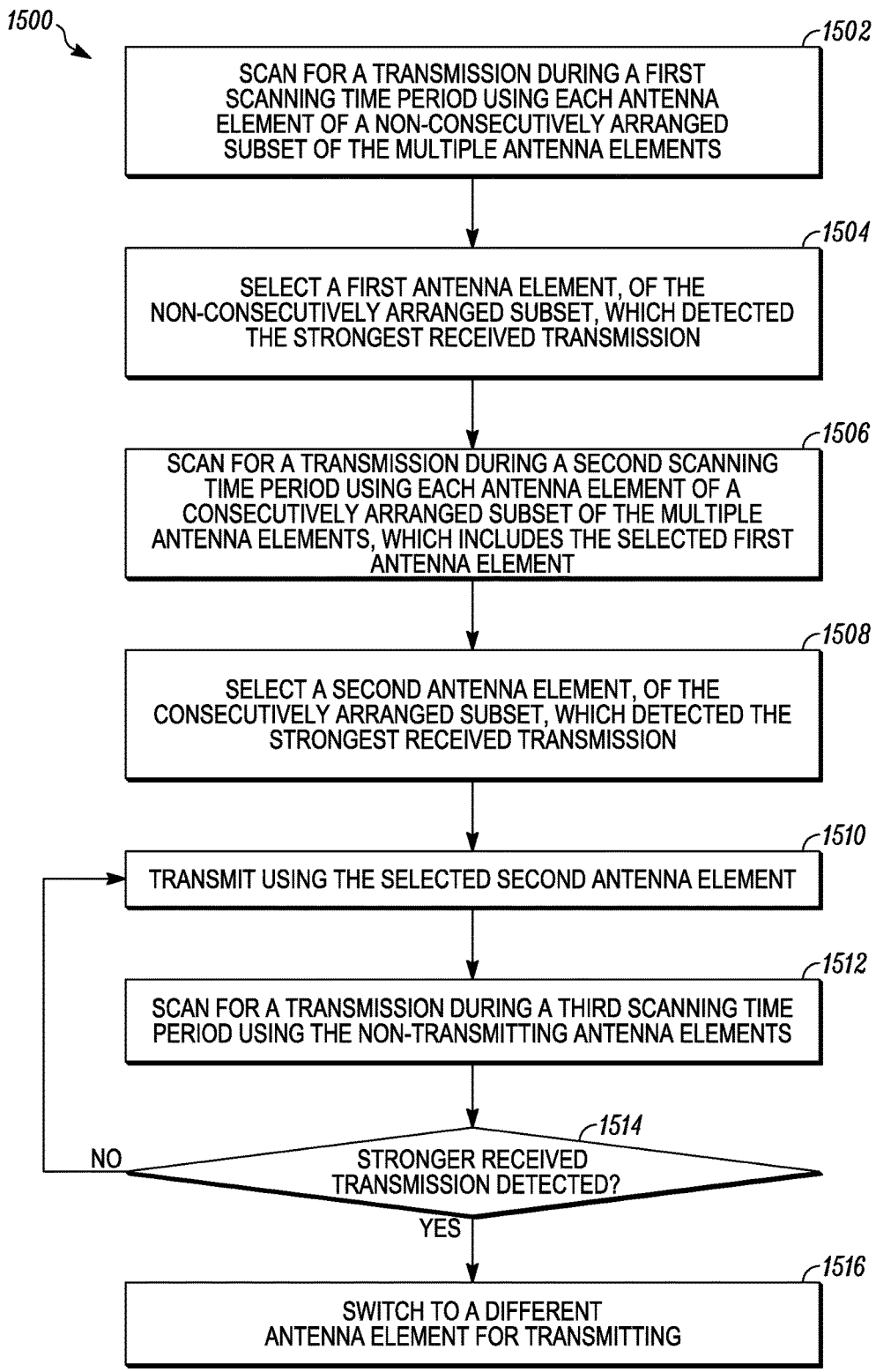
FIG. 15 shows a logical flow diagram illustrating a method for operating an antenna array to concentrate radiation of radio waves through the sidewall of a portable electronic device, in accordance with some embodiments.
Figure 16:
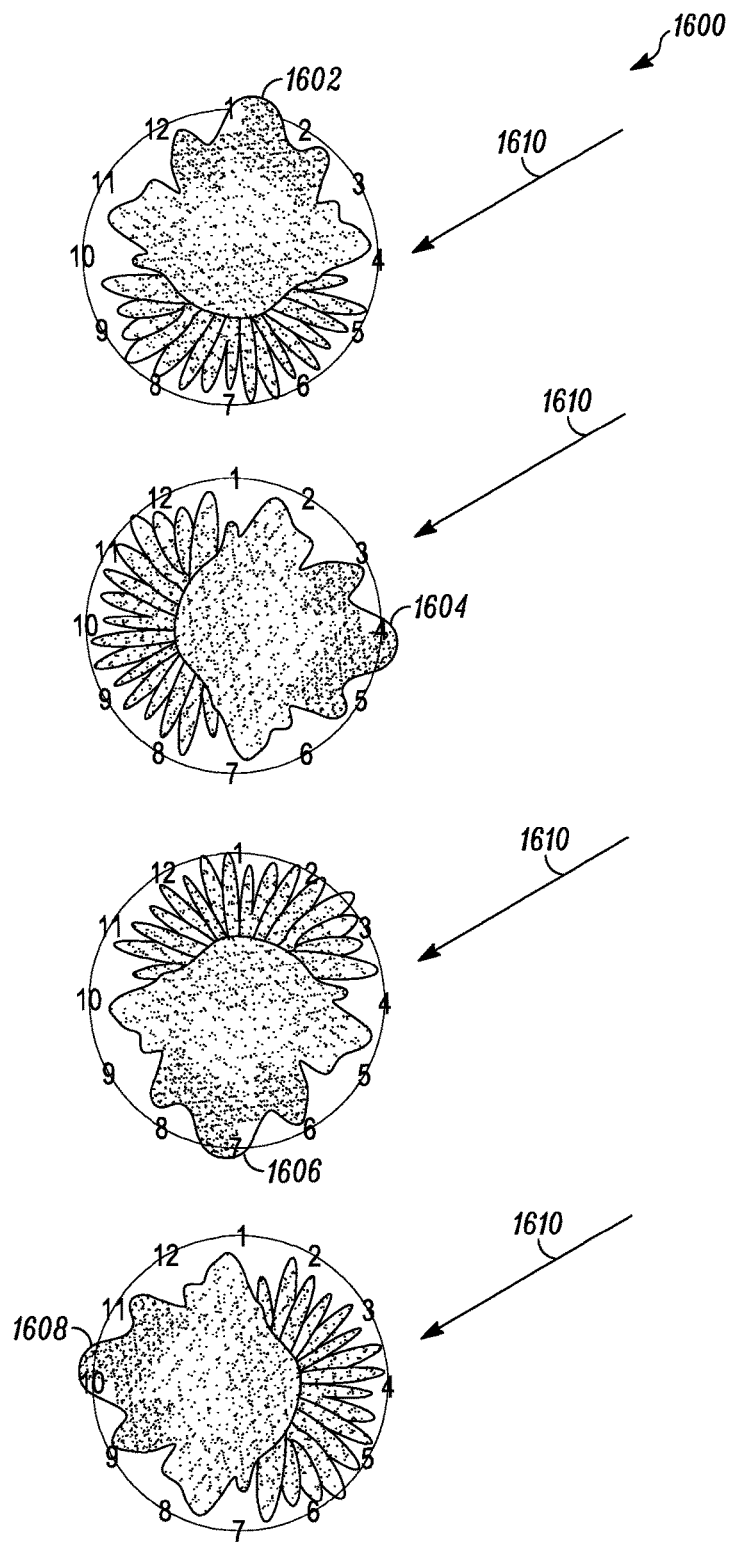
FIG. 16 shows radiation patterns while performing the method of FIG. 15, in accordance with some embodiments.

FIG. 15 shows a logical flow diagram illustrating a method 1500 for operating an antenna array to concentrate radiation of radio waves through the sidewall of a portable electronic device, in accordance with some embodiments. For example, any of the antenna array embodiments described herein can be operated using the method 1500. FIG. 16 shows diagrams 1600 illustrating a particular example of an antenna array operated in accordance with an algorithm consistent with the method 1500. The antenna array of FIG. 16 includes 12 antenna elements numbered 1, 2, 3, 4, 5, 6, 7, 8, 9, 10, 11, and 12. FIGS. 15 and 16 are described together for greater understanding.

In general, the method 1500 includes a portable electronic device, e.g., the device 100, scanning using a subset of the twelve antenna elements of the antenna array. Consistent with the teachings herein, the antenna elements are electrically coupled around an edge of a printed circuit board of the portable electronic device. The scanning is to select a communication antenna element. Upon the selecting, the device communicates radio waves using the selected communication antenna element. The communication is concentrated laterally through a communication plane that is parallel to a housing sidewall of the portable electronic device and that is perpendicular to a device face and a planar housing surface of the portable electronic device. The housing sidewall is positioned perpendicular to and at a periphery of the planar housing surface.

For the embodiment of the method 1500 illustrated in FIG. 15, scanning using the subset of multiple antenna elements includes scanning 1502 for a transmission during a first scanning time period using each antenna element of a non-consecutively arranged subset of the multiple antenna elements. For an example, the antenna elements are grouped into multiple groups for scanning. The groupings can be programmed into the device 100 to allow the device 100 to roughly estimate a direction of a transmission from an external device, such as a transmission 1610. For a simpler algorithm the groupings are constant. However, for more complex algorithms the groupings can be changed dynamically depending on one or more factors.

As shown in FIG. 16, the antenna elements are grouped into four illustrative groups: 1602 containing antenna elements 1, 2, and 3; 1604 containing antenna elements 4, 5, and 6; 1606 containing antenna elements 7, 8, and 9; and 1608 containing antenna elements 10, 11, 12. One antenna element is selected from each grouping to create the non-consecutively arranged subset of the multiple antenna elements used for scanning during the first scanning time period. For this example, the non-consecutively arranged subset includes antenna elements 1, 4, 7, and 10. The particular antenna elements selected should represent different sub-areas of the entire scanning area (which in this case is all around the periphery of the housing sidewall 106 of the device 100) to obtain the best rough or initial estimate of the direction of the transmission 1610.

The scanning can be performed by sequentially turning ON each of the antenna elements 1, 4, 7, and 10 in receive-only mode, or in other words, with the receive circuitry coupled into the antenna element path to detect a received transmission or signal, e.g., 1610. The antenna element that detects the strongest received transmission is selected 1504 and used in a subsequent scanning 1506 to narrow the direction of the transmission 1610. The antenna elements are sequentially turned ON and OFF to detect the transmission to reduce mutual coupling between the antenna elements. However, this is not a requirement.

Received or detected transmission strength can be indicated using one or more measurements including but not limited to one or a combination of angle of arrival, received signal strength indicator (RSSI), received channel power indicator (RCPI), etc. For a particular embodiment, the angle of arrival measurement is used to indicate received transmission strength. Namely, an antenna element having a beam or direction of transmission that most closely aligns with an estimated angle of arrival is determined to have the strongest detected transmission.

Angle of arrival determines the direction of a received transmission by measuring the time difference of arrival (TDOA) at individual antenna elements of the antenna array. The TDOA measurement, which is the delay of arrival of a transmission at a scanning antenna element, can be directly made by measuring the difference in received phase at the scanning antenna element. The angle of arrival can be calculated from the multiple TDOA measurements.

Going back to the FIG. 16 example, the device 100 determines TDOA measurements for the antenna elements 1, 4, 7, and 10 and determines an angle of arrival for the transmission 1610. Based on the location of the antenna elements on the device 100 and the position of the device 100 in space (which can be determined by various sensors on the device 100 such as a gyroscope, a magnetometer, etc.), the device 100 can determine a beam direction for each scanning antenna element. The device 100 then determines 1504 which of the antenna elements 1, 4, 7, or 10 has a beam direction that most closely aligns with the calculated angle of arrival, which in this case is antenna element 4.

This first selected antenna element is included within a consecutively arranged subset of the multiple antenna elements to scan 1506 for the transmission 1610 during a second and subsequent scanning time period. For an implementation example, the device 100 selects a set of adjacent antenna elements that includes the antenna element 4, for instance antenna elements 3, 4, and 5, for the subsequent scan. The device 100 can then sequentially operate these three antenna elements in receive mode and make TDOA measurements for each of the three antenna elements to refine the angle of arrival measurement. The device 100 also determines a beam direction for each of the three antenna elements. The antenna element that detected the strongest received transmission (e.g., the antenna element having a beam direction that most closely aligns with the calculated angle of arrival), in this case antenna element 3, is selected 1508 as the communication antenna element. Accordingly, the antenna element 3 is used to transmit 1510 radio waves from the device 100, for instance to the device sending the transmission 1610.

While communications are ongoing using the selected communication antenna element 3, the device 100 scans 1512 for the transmission 1610 during a third and subsequent time period, for instance by performing the method 1500 with the non-transmitting antenna elements. If a stronger received transmission is detected 1514 using another antenna element, e.g., the device 100 determines the beam direction of another antenna element more closely aligns with a calculated angle of arrival, the device 100 switches 1516 to the other antenna element for transmissions.

By grouping the antenna elements for scanning, instead of scanning using all available non-transmitting antenna elements, the best antenna element for transmitting can be more quickly determined. Additionally, since the antenna elements are located all around the periphery of the device 100, 360 degree scanning can be performed using a simple ON/OFF scheme, such as method 1500, without the need for costly phase shifters and amplitude control. This can lower the cost of a device and reduce antenna array integration complications.

In the foregoing specification, specific embodiments have been described. However, one of ordinary skill in the art appreciates that various modifications and changes can be made without departing from the scope of the material as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The embodiments are defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. Apparatus comprising:
a device housing having a shape characterized by an axis, a planar housing surface that is perpendicular to the axis, and a housing sidewall that is parallel to the axis, wherein the housing sidewall is positioned along a periphery of the planar housing surface;
a device face coupled to the device housing and positioned perpendicular to the axis at an opposite end of the device housing from the planar housing surface;
a printed circuit board positioned within the device housing between and parallel to the planar housing surface and the device face;
an antenna array having multiple antenna elements at least some of which are electrically coupled to the printed circuit board, wherein the antenna array is configured to concentrate radiation of radio waves laterally through a radiation plane that is parallel to the housing sidewall and that is perpendicular to the device face and the planar housing surface.

2. The apparatus of claim 1, wherein the antenna array further comprises a substrate positioned parallel to the housing sidewall and perpendicular to the printed circuit board, wherein the multiple antenna elements are arranged on a face of the substrate.

3. The apparatus of claim 2, wherein one or more of the housing sidewall, a ground segment of the printed circuit board, or an inner metal wall function as an electrical ground for the antenna array, wherein the inner metal wall is positioned parallel to the substrate, and the substrate is positioned between the inner metal wall and the housing sidewall.

4. The apparatus of claim 3 further comprising a set of contacts connecting the inner metal wall to the printed circuit board, wherein at least a first subset of the set of contacts function as the electrical ground for the antenna array.

5. The apparatus of claim 4, wherein the at least a first subset of contacts function as the electrical ground when the antenna array operates at a first frequency and function as the electrical coupling to the printed circuit board for at least a subset of the multiple antenna elements when the antenna array operates at a second frequency.

6. The apparatus of claim 4, wherein at least a subset of the multiple antenna elements are electrically coupled to the printed circuit board using a set of feed lines that are dispersed between at least some of the contacts of the set of contacts.

7. The apparatus of claim 1, wherein the multiple antenna elements comprise one of:
a plurality of shaped patches of metal mounted on a substrate positioned parallel to the housing sidewall and perpendicular to the printed circuit board;
a plurality of inverted-F antenna elements mounted on the substrate positioned parallel to the housing sidewall and perpendicular to the printed circuit board;
a plurality of monopole antenna elements mounted on the substrate positioned parallel to the housing sidewall and perpendicular to the printed circuit board;
a plurality of monopole antenna elements mounted at an edge of the printed circuit board;
a plurality of dipole antenna elements mounted on the substrate positioned parallel to the housing sidewall and perpendicular to the printed circuit board;
a plurality of dipole antenna elements mounted at the edge of two layers of the printed circuit board; or
a plurality of substrate integrated waveguide antenna elements mounted between the two layers of the printed circuit board.

8. The apparatus of claim 1, wherein all of the multiple antenna elements of the antenna array are electrically coupled to the printed circuit board using a set of feed lines.

9. The apparatus of claim 1, wherein a first subset of the multiple antenna elements is electrically coupled to the printed circuit board using a set of feed lines, and a second subset of the multiple antenna elements are passive antenna elements.

10. The apparatus of claim 1, wherein each antenna element of the multiple antenna elements comprises a first conductive element electrically coupled to the printed circuit board and mounted at an edge of a first layer of the printed circuit board.

11. The apparatus of claim 10, wherein each antenna element of the multiple antenna elements further comprises a second conductive element electrically coupled to the printed circuit board and mounted at an edge of a second layer of the printed circuit board.

12. The apparatus of claim 1, wherein the printed circuit board comprises first and second layers having a space therebetween and positioned between and parallel to the planar housing surface and the device face, wherein the first layer comprises a first planar metal surface, and the second layer comprises a second planar metal surface overlaid, at least in part, by a substrate, wherein each of at least a first subset of the multiple antenna elements of the antenna array is configured as a substrate integrated waveguide antenna element comprising:
a plurality of metal vias connected between the first and second planar metal surfaces to form a cavity between aligned portions of the first and second layers of the printed circuit board, wherein the plurality of metal vias are arranged as a non-continuous sidewall for the cavity;
a feed line that electrically couples the substrate integrated waveguide antenna element to the printed circuit board within the cavity.

13. The apparatus of claim 1, wherein the device housing, the device face, the printed circuit board, and the antenna array are elements of a wearable electronic device.

14. The apparatus of claim 13, wherein the wearable electronic device is a smartwatch.

15. The apparatus of claim 1, wherein a cross section of the device housing is in a shape of a polygon or in a shape of a closed-plane curve.

16. A method comprising:
scanning using a subset of multiple antenna elements of an antenna array, wherein the multiple antenna elements are electrically coupled around an edge of a printed circuit board of a portable electronic device, wherein the scanning is to select a communication antenna element;
communicating radio waves using the selected communication antenna element, wherein the communicating is concentrated laterally through a communication plane that is parallel to a housing sidewall of the portable electronic device and that is perpendicular to a device face and a planar housing surface of the portable electronic device, wherein the housing sidewall is positioned perpendicular to and at a periphery of the planar housing surface.

17. The method of claim 16, wherein scanning using the subset of multiple antenna elements comprises scanning for a transmission during a first scanning time period using each antenna element of a non-consecutively arranged subset of the multiple antenna elements.

18. The method of claim 17 further comprising:
selecting a first antenna element, of the non-consecutively arranged subset of the multiple antenna elements, which detected a strongest received transmission during the first scanning time period;

narrowing a direction of the transmission using the selected first antenna element.

19. The method of claim 18, wherein narrowing the direction of the transmission using the selected first antenna element comprises:

scanning for the transmission during a second scanning time period subsequent to the first scanning time period using each antenna element of a consecutively arranged subset of the multiple antenna elements, wherein the consecutively arranged subset includes the selected first antenna element;

selecting a second antenna element, of the consecutively arranged subset of the multiple antenna elements, which detected a strongest received transmission during the second scanning time period.

20. The method of claim 19 further comprising:

transmitting radio waves using only the selected second antenna element;

scanning for the transmission during a third scanning time period subsequent to the second scanning time period;

switching to a different antenna element of the multiple antenna elements for transmitting the radio waves when the different antenna element detects a strongest received transmission during the third scanning time period.

* * * * *